United States Patent
Yin et al.

(10) Patent No.: US 9,788,228 B2
(45) Date of Patent: Oct. 10, 2017

(54) MOBILE DATA COLLECTION IN A WIRELESS SENSING NETWORK

(75) Inventors: Fei Yin, Shanghai (CN); Haifeng Wang, Shanghai (CN); Zhenhong Li, Shanghai (CN); Juan Xiao, Shanghai (CN); Ping Wang, Shanghai (CN); Fuqiang Liu, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 285 days.

(21) Appl. No.: 14/395,217

(22) PCT Filed: Apr. 18, 2012

(86) PCT No.: PCT/CN2012/074280
§ 371 (c)(1),
(2), (4) Date: Oct. 17, 2014

(87) PCT Pub. No.: WO2013/155685
PCT Pub. Date: Oct. 24, 2013

(65) Prior Publication Data
US 2015/0092543 A1 Apr. 2, 2015

(51) Int. Cl.
*H04W 84/18* (2009.01)
*H04W 28/02* (2009.01)
(Continued)

(52) U.S. Cl.
CPC ....... *H04W 28/0215* (2013.01); *H04L 67/125* (2013.01); *H04W 4/006* (2013.01);
(Continued)

(58) Field of Classification Search
None
See application file for complete search history.

(56) References Cited

U.S. PATENT DOCUMENTS

| | | | |
|---|---|---|---|
| 7,443,833 B2* | 10/2008 | Ayyagari | H04L 45/02 370/254 |
| 8,275,313 B1* | 9/2012 | Myers | H04W 84/18 370/235 |

(Continued)

FOREIGN PATENT DOCUMENTS

CN 101795480 A 8/2010

OTHER PUBLICATIONS

Shuai Gao, et. al., Efficient Data Collection in Wireless Sensor Networks with Path-Constrained Mobile Sinks, IEEE Transactions on Mobile Computing, Apr. 2011, pp. 592-608, vol. 10, No. 5, Apr. 2011, 17 pages.

(Continued)

*Primary Examiner* — Hassan Phillips
*Assistant Examiner* — Gautam Sharma
(74) *Attorney, Agent, or Firm* — Oblon, McClelland, Maier & Neustadt, L.L.P.

(57) ABSTRACT

A mobile gateway device collects identities of a first set of radio nodes which are within one hop of the mobile gateway; and checks at least the collected identities against a first table and a second table. The first table lists node identities and corresponding data validity timers. The second table lists node identities and no corresponding data validity timers. From the checking the device selects a group of radio nodes to activate for collecting and reporting data. The device determines parent child relations among the radio nodes, which are sensor nodes of a wireless sensing network in an embodiment, and uses the list to activate only those nodes for which it does not have valid data to sense new data and transmit their sensing results.

20 Claims, 8 Drawing Sheets

(51) Int. Cl.
 *H04W 8/00* (2009.01)
 *H04W 4/00* (2009.01)
 *H04L 29/08* (2006.01)
 *H04W 88/16* (2009.01)

(52) U.S. Cl.
 CPC ............ *H04W 8/005* (2013.01); *H04W 84/18* (2013.01); *H04W 88/16* (2013.01)

(56) References Cited

U.S. PATENT DOCUMENTS

| | | | |
|---|---|---|---|
| 2002/0032761 A1* | 3/2002 | Aoyagi | H04L 12/462 709/223 |
| 2004/0160943 A1* | 8/2004 | Cain | H04L 1/0041 370/351 |
| 2005/0174950 A1* | 8/2005 | Ayyagari | H04L 41/30 370/254 |
| 2006/0268791 A1* | 11/2006 | Cheng | H04W 72/1278 370/338 |
| 2007/0100853 A1* | 5/2007 | Paparella | H04L 12/2602 |
| 2007/0201385 A1* | 8/2007 | Goto | H04L 12/4625 370/254 |
| 2008/0089333 A1* | 4/2008 | Kozat | H04L 1/004 370/390 |
| 2012/0093087 A1* | 4/2012 | Chen | H04L 45/025 370/328 |
| 2012/0102192 A1* | 4/2012 | Takeshima | H04L 29/12066 709/224 |
| 2015/0092543 A1* | 4/2015 | Yin | H04W 8/005 370/230 |
| 2015/0373482 A1* | 12/2015 | Barnard | H05B 37/0272 370/338 |

OTHER PUBLICATIONS

Xinxin Liu, et al., Trailing Mobile Sinks: A Proactive Data Reporting Protocol for Wireless Sensor Networks, Mobile Adhoc and SensorSystems (MASS), 2010 IEEE 7th, International Conference on Nov. 8-12, 2010, 10 pages.

* cited by examiner

MOBILE DATA COLLECTION IN A WIRELESS SENSING NETWORK

TECHNICAL FIELD

The exemplary and non-limiting embodiments of this invention relate generally to wireless communication systems, methods, devices and computer programs, and more specifically relate to data collection by a mobile node from a sensor network.

BACKGROUND

Much research has recently centered on converging disparate wireless networks. One such convergence relative to the examples herein is that of wireless sensor networks with a cellular wireless telecommunication network. Such a convergence can potentially extend the services that each network might provide; the cellular network can manage/control devices of the sensor network for monitoring and data collection while the wireless sensor network can utilize the telecommunication network to share its information with other networks. For example, some network-operator members of the Third Generation Partnership Project (3GPP) have expressed interest in utilizing cellular user equipments (UEs) as gateways/data collection sinks for what 3GPP terms capillary networks which can be wireless sensor networks.

Traditional wireless sensor networks relied upon a single data sink to collect the data from all the other sensors via multi-hop transmissions through the network. Of course those devices within one hop of the sink tend to become data bottlenecks, which increases their energy consumption. To the extent these devices rely on a battery/galvanic or other finite power source they would go offline once their energy source was depleted, resulting in partition of the network topology. Mobile data sinks have been proposed as a solution so as to geographically balance the energy consumption among the sensor nodes throughout the sensor network. This also distributes the responsibility of relaying data to the sink among many nodes in the sensor network. As mentioned above, one option to converge the telecommunication and wireless sensor networks is to utilize devices with cellular interfaces as the mobile sinks.

Converging these types of networks using a mobile UE brings efficiency challenges. Without mobile data sinks the conventional static sensor networks employed a static and fixed data collection topology to collect the network-wide data. Using a mobile data sink the data collection topology at one time is not sufficient at another time due to the data sink's mobility, and so the data collection topology needs to be constructed or updated from time to time according to the mobile UE's movement. But to directly adopt the traditional data collection paradigm would result in building a series of independent data collection topologies when the mobile user at different positions. This introduces a large volume of communication control overhead, and these topology transitions are seen to result in some time delay that may lead to discontinuity or even loss of the data delivered to the mobile user, thus reducing the quality of service (QoS) of the data collection.

Relevant background teachings may be seen in a paper by Shuai Gao, Hongke Zhang, and Sajal K. Das entitled EFFICIENT DATA COLLECTION IN WIRELESS SENSOR NETWORKS WITH PATH-CONSTRAINED MOBILE SINKS (*IEEE Transactions on Mobile Computing*, vol. 10, no. 5; pages 592-608; 2011). One limitation there is that it assumes the mobile sink moves along a constrained path (termed a Maximum Amount Shortest Path or MASP). Sensors out of the range of the sink are assigned to corresponding subsinks within the range of the sink according to the length of the communication time between the mobile sink and the subsinks to improve network throughput. But in many deployments the planned or accurately predicted mobility path for a mobile sink is not a valid assumption.

Further background is detailed in a paper by Xinxin Liu, Han Zhao, Xin Yang and Xiaolin Li entitled TRAILING MOBILE SINKS: A PROACTIVE DATA REPORTING PROTOCOL FOR WIRELESS SENSOR NETWORKS (*IEEE Transactions on Computers*; pages 214-223; 2011). This paper describes a proactive data reporting protocol termed SinkTrail in which each sensor node keeps its logical distance to the mobile sink and when it wants to route data to the mobile sink the sensor selects the next hop with the shortest logical distance to the mobile sink. But increasing the scale of a SinkTrail type of network is seen to result in frequent message flooding, which will cause congestion and impair the network's lifetime.

SUMMARY

In a first exemplary embodiment of the invention there is a method for controlling a mobile gateway device comprising: collecting identities of a first set of radio nodes which are within one hop of the mobile gateway; checking at least the collected identities against a first table that comprises node identities and corresponding data validity timers and a second table that comprises node identities and no corresponding data validity timers; and based on the checking, selecting a group of radio nodes to activate for collecting and reporting data.

In a second exemplary embodiment of the invention there is an apparatus for selectively collecting data from radio nodes, and the apparatus comprises a processing system such as for example at least one memory including computer program code and at least one processor. In this exemplary embodiment the processing system is configured to cause the apparatus to perform: collecting identities of a first set of radio nodes which are within one hop of the mobile gateway; checking at least the collected identities against a first table that comprises node identities and corresponding data validity timers and a second table that comprises node identities and no corresponding data validity timers; and based on the checking, selecting a group of radio nodes to activate for collecting and reporting data.

In a third exemplary embodiment of the invention there is a computer readable memory comprising a set of instructions, which when executed on a mobile gateway device, causes the mobile gateway device to perform the steps of: collecting identities of a first set of radio nodes which are within one hop of the mobile gateway; checking at least the collected identities against a first table that comprises node identities and corresponding data validity timers and a second table that comprises node identities and no corresponding data validity timers; and based on the checking, selecting a group of radio nodes to activate for collecting and reporting data.

In a fourth exemplary embodiment of the invention there is an apparatus for encoding a bit string. In this embodiment the apparatus comprises receiving means, comparing means and also selecting means. The receiving means is for collecting identities of a first set of radio nodes which are within one hop of the mobile gateway. The comparing means is for checking at least the collected identities against a first table that comprises node identities and corresponding data validity timers and a second table that comprises node identities and no corresponding data validity timers. And the selecting means is for selecting, based on an output of the comparing means, a group of radio nodes to activate for collecting and reporting data.

As non-limiting examples for this fourth embodiment, the receiving means may be a radio receiver, or an input from a radio receiver into a functional processing block or processing system. The comparing means and the selecting means may be implemented as one or more processors executing computer program code stored on one or more memories.

DETAILED DESCRIPTION

In conventional mechanisms for using a mobile gateway/UE to collect data, the mobile UE moves to a place and activates all the sensor nodes that are within its one-hop range and collects data from them all. These activated sensor nodes each activate all their child nodes for data collection via traditional multi-hops methods. In these conventional mechanisms the result of movement by the data sink/UE results in sensor nodes being frequently activated for data collection. This is inefficient because often the underlying data gathered and reported by a sensor does not change or changes very little over a period of time, and so this frequent activation for data collection and reporting adds little to the substance of the data that the mobile UE already collected on its previous round. This period of time depends on the data being collected; soil moisture data collected by agricultural sensors in a network used for field irrigation purposes may be valid for a much longer period of time than traffic congestion data collected by sensors in an urban environment. In the wireless arts the validity time of channel measurement data is sometimes referred to as a coherence time or coherence interval so it is known to find validity times for data based on the underlying data itself. The description below refers to this time during which the data is valid as a validity time, and the validity time is tracked by a validity timer as is detailed below.

Exemplary embodiments of these teachings provide an energy-efficient data collection scheme to collect data from the sensor nodes based on the period of data validity, which enables the mobile UE to move about randomly in wireless sensor network without sacrificing these efficiency advantages. As will be detailed more particularly below, only necessary sensor nodes should be activated for data collection/transmission while the other sensor nodes may continue to remain in a sleep mode to save energy.

First a brief explanation of terms. Within the one-hop range of the mobile gateway there are some sensor nodes. Some of those sensor nodes may be related in a parent-child type relation. The highest parent nodes (HPNs) are those devices in the sensing network which are within one hop of the mobile gateway/UE and which are also topologically the highest parent nodes. The examples below further categorize these HPNs as those which are HPNs at the present time (current highest parent nodes) or during some previous round of data reporting (historical highest parent nodes). Child nodes are those sensing nodes/devices in the one-hop range of the mobile gateway/UE that are not HPNs. Nodes of the wireless sensor network are assumed to have the ability to collect data and to report it wirelessly to the mobile gateway/UE, and/or to other nodes in the sensor network for relay via some current parent node to the UE. The UE is assumed to have the ability to communicate with the wireless sensor nodes and also with some other wireless network such as a cellular telecommunications network for reporting its collected data to entities that lie beyond the wireless sensor network.

Figure 2:
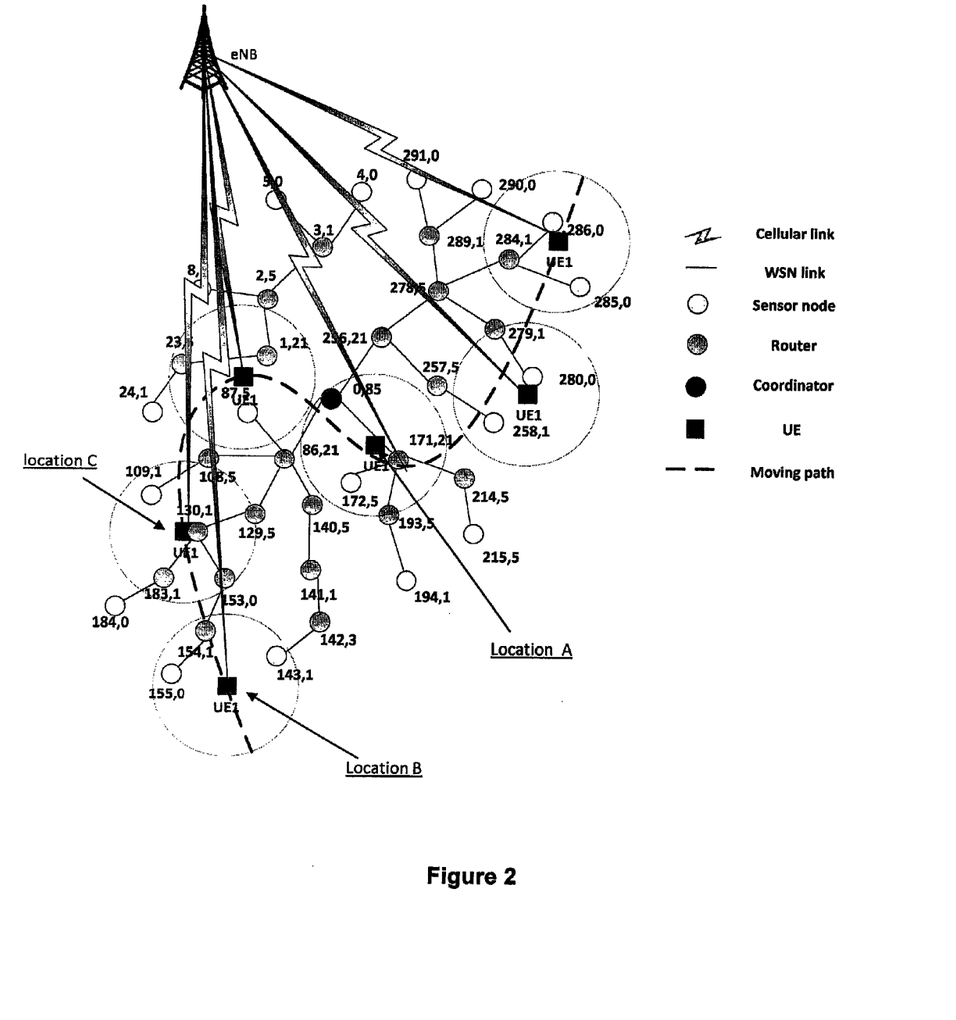
FIG. 2 is an overview of a mobile gateway/user equipment (UE) moving among a sensor network and collecting data from only those sensors it activates for data collection using the tables of FIG. 1 according to exemplary embodiments of these teachings.

A few examples illustrate the parent and child node distinction. At location A there are four sensor nodes within the one-hop range of the mobile gateway/UE: #0, #171, #172 and #193. Sensor node #171 is the parent of sensor nodes #172 and #193, while sensor node #0 is the parent of sensor node #171. Thus the sensor node #0 is the HPN among these four nodes. It is darkened to indicate it is the coordinator of this personal area/wireless sensor network, meaning it is the parent to every other sensor device in the network. As one example of how the mobile gateway can know this parent-child filiation among the various nodes, if for example the sensor network is operating according to IEEE 802.15.4 that specification defines an address algorithm for the sensors of a wireless sensing network. The mobile gateway/UE can easily know this addressing algorithm, learn the addresses of the sensor nodes either from signaling or uploading some initial information before it goes to collect sensing data, and from this information can determine the filiation of the various sensor nodes.

At location B there are three sensor nodes: #143, #154 and #155. Node #143 is not connected in the wireless sensor network to any other sensor nodes that are within this same one-hop range and so it is a HPN. Sensor node #155 is a child of sensor node #154 so sensor node #154 is another HPN, leaving sensor node #155 as the only child node at location B. At location C the HPNs are sensor nodes #109 and #130 and the child nodes are sensor nodes #153 and #183 (assuming #108 and #129 are out of range).

Figure 1:
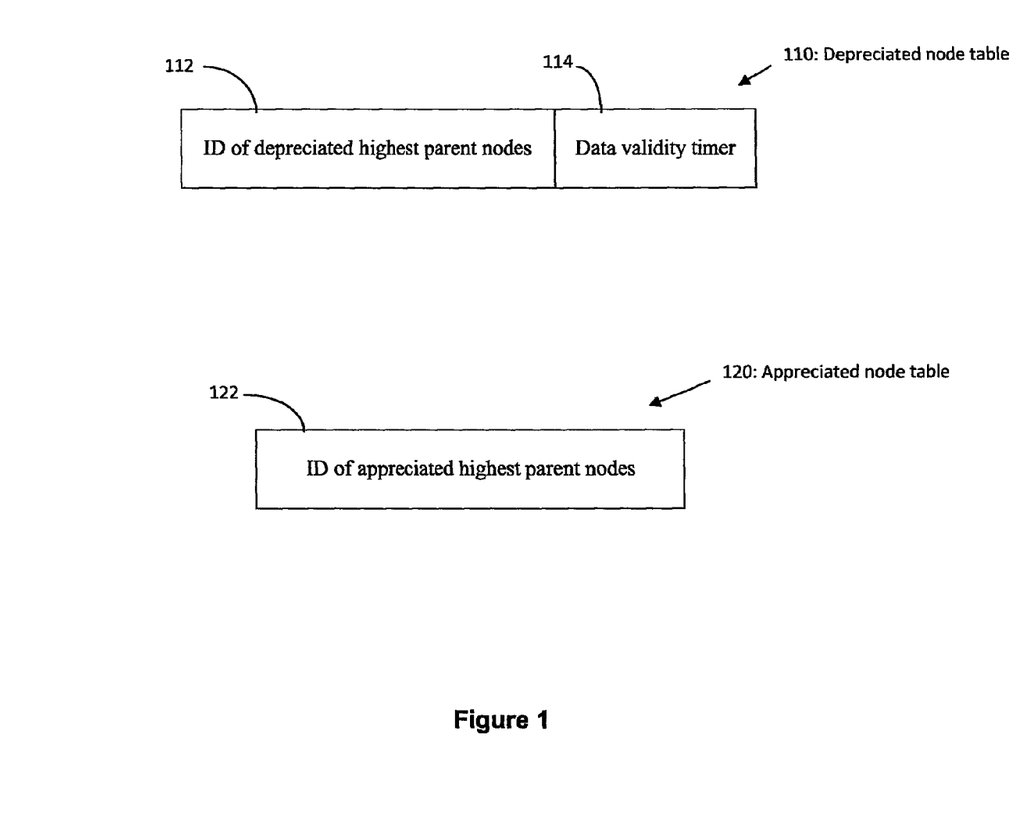
FIG. 1 illustrates exemplary embodiments of a depreciated node table and an appreciated node table which are kept by the mobile gateway to track which sensor nodes to activate according to exemplary embodiments of these teachings.

In an aspect of these teachings the mobile UE maintains two tables as shown by non-limiting example at FIG. 1, a depreciated node table 110 and an appreciated nodes table 120. From these two tables the UE determines the sensors nodes which should be activated for data collection and reporting. The nodes listed in these tables are the historical highest parent nodes (H-HPN), which are all of the HPNs which were in the one-hop range of the mobile UE when the mobile UE performed a previous round of data collection.

While it is convenient to describe this information as being in two tables, dual tables is not a limiting factor to these teachings. There may be a single table or database which carries both sets of information in a form that the two sets can be parsed easily or searched separately to see if there is a matching node identifier. Or there may be only one table and the search for matching depreciated node identities also searches for a corresponding data validity timer which is not a part of the search for matching appreciated node identities. The two sets of information may be in different tables, or different databases which by their dual nature are necessarily able to be searched separately, or may be stored in other than table form.

Identities of the depreciated highest parent nodes (D-HPN) are listed at field 112 of depreciated node table 110. The D-HPNs are all of the H-HPNs whose data validity timer at field 114 has not expired. These D-HPNs should not be activated for data collection because the current data the mobile UE has from these nodes is still valid according to the timer. Once a highest parent node (HPN) is activated and its data is collected by the mobile UE, this node is added to the depreciated node table 110 as a D-HPN and a timer is initiated to track and maintain the data validity period. The data validity timer (DVT) for each D-HPN is used to indicate the remaining valid time of the data which was collected from its corresponding D-HPN. Once the data validity timer is expired, the data collected from the related D-HPN is no longer valid.

Identities of the appreciated highest parent nodes (A-HPN) are listed at field 122 of the appreciated node table 120. These are all of the H-HPNs which could be re-activated for data collection but its data validity timer has expired. Once a D-HPN's data validity period 114 is expired, this D-HPN is deleted from the depreciated node table 110 and added to the appreciated node table 120 as an A-HPN. Once an A-HPN listed on the appreciated node table 120 is re-activated for data collection, this A-HPN is deleted from the appreciated node table 120 and added back to the depreciated node table 110 as a D-HPN.

In an embodiment the mobile UE utilizes an algorithm according to these teachings to determine necessary nodes of the sensor network from which to collect sensor data based on the information stored in the tables. The mobile UE uses this algorithm to determine whether data should be collected from the current highest parent nodes (C-HPN) within the mobile UE's one-hop range. In an exemplary embodiment the mobile UE also uses this algorithm to determine whether the child nodes of the mobile UE's C-HPNs should be activated for data collection/transmission.

The more detailed description below makes the following non-limiting assumptions:

The wireless sensors are networked based on IEEE 802.15.4 and ZigBee tree topology.

The addresses are allocated to the wireless sensor network nodes based on the address allocation mechanism defined in ZigBee.

The UE is aware of the sensor node's address allocation mechanism.

All the wireless sensor network nodes are in a sleep state initially.

The UE randomly moves in the wireless sensor network coverage to freely collect data.

The collected data remains been valid for a period of time, during which there is no need to recollect the same data.

FIG. 2 is a non-limiting overview of a data collection environment in which the mobile UE (UE1) is moving among a sensor network along the dotted path and wirelessly collecting data from only those sensors it activates for data collection. In the wireless sensor network the sensors are networked via tree topology and are in a sleep state unless/until activated by the mobile UE1. The mobile UE1 randomly moves about and freely stops in some places to collect data from the sensor nodes, each stop shown as another rendition of the square UE1 at the center of a circle. The sensor nodes are activated to collect and report their data, and go to sleep again until again activated some other time by the mobile UE1.

Embodiments of these teachings provide an energy efficient data collection process in that the mobile UE1 determines and updates the A-HPNs and D-HPNs based on the data validity, and only activates the necessary sensor nodes for the data collection/reporting (sensor data transmission by the sensor network nodes).

Figure 3:
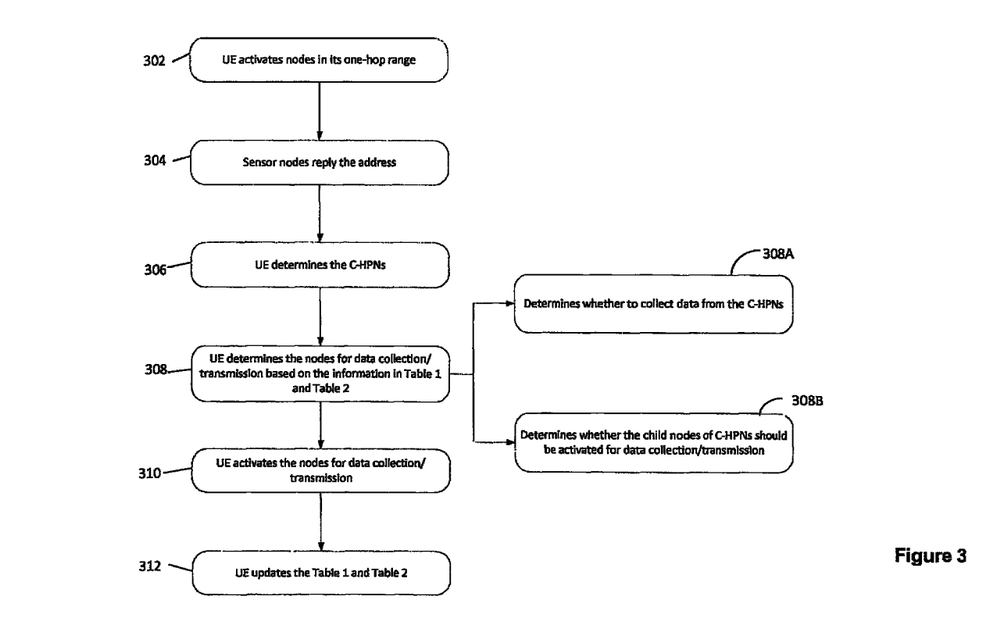
FIG. 3 is a logical flow diagram illustrating steps taken by a mobile gateway/UE and by various sensor nodes according to these teachings.

FIG. 3 illustrates high level process steps for data collection by the mobile UE according to an exemplary embodiment of these teachings. At step 302 the mobile UE activates the sensor nodes in its one-hop range when it stops for data collection. Per block 304 this is so the mobile UE can learn the addresses of the one-hop sensor devices, so activating the one-hop devices for this purpose is different from activating the sensor nodes for data collection and reporting. For example, a sensor device within the one-hop range may be activated at block 302 so that the mobile UE can learn its address, but then the mobile UE sees that it already has valid data for this sensor device and the mobile UE will not further direct this same sensor device for collecting and reporting its sensing data. Or if instead the mobile UE finds that the validity timer for the data it previously collected from this same sensor device has expired, the mobile UE may also additionally direct this same sensor device for data collection and reporting. How the mobile UE selects which sensor devices are selected for data collection and reporting is detailed further below.

At step 304 the activated nodes reply their address to the mobile UE. In one embodiment the mobile gateway/UE uses this address as the identifier listed in the depreciated node table 110 (FIG. 1), but in other embodiments the mobile gateway/UE may choose some other more convenient identifier. At step 306 the mobile UE receives the address and determines which are the C-HPNs.

Figure 4:
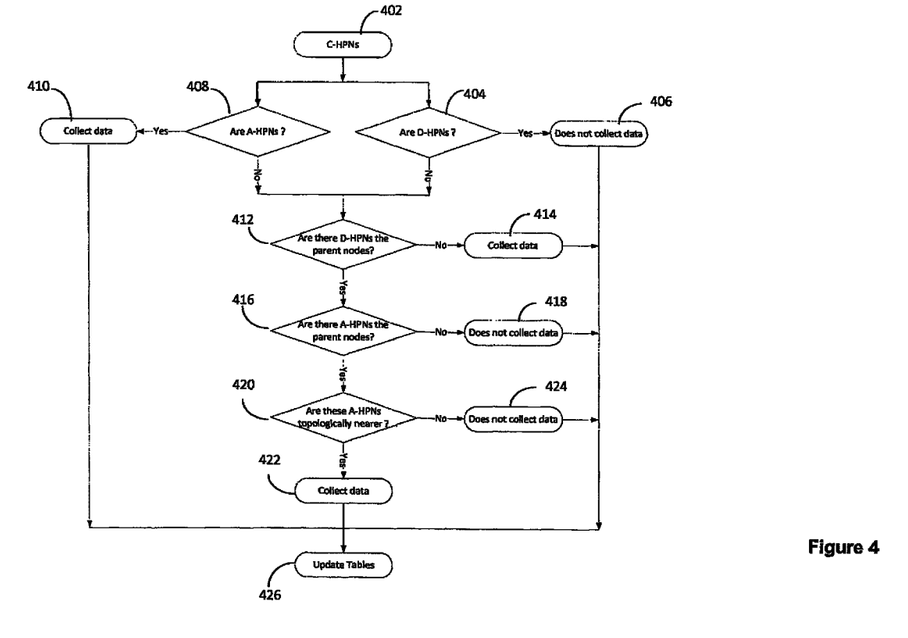
FIG. 4 is a logical flow diagram illustrating steps taken by a mobile gateway/UE for deciding which parent node sensors within its one-hop range to collect data from according to an exemplary embodiment of these teachings.
Figure 5:
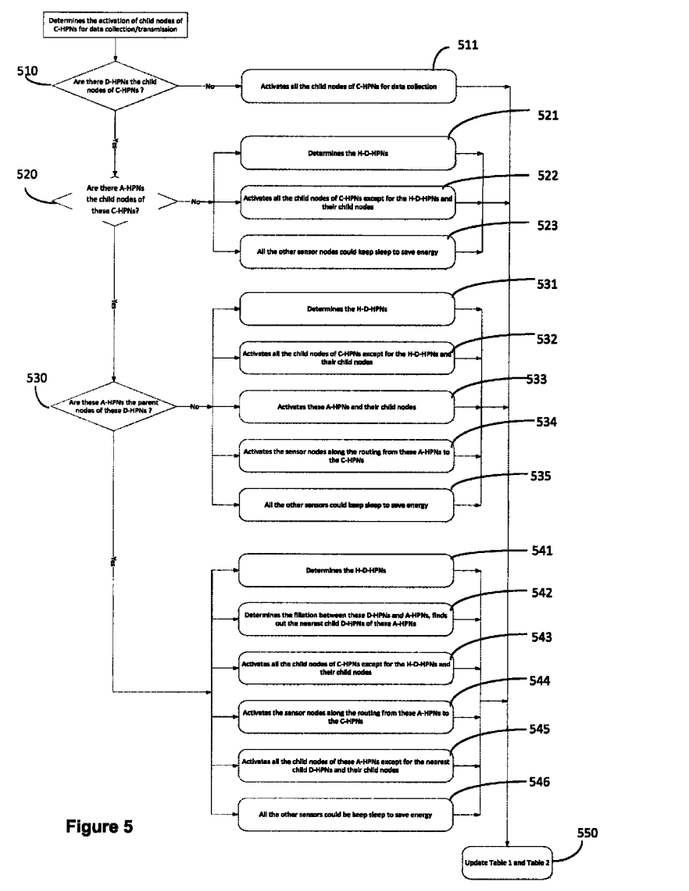
FIG. 5 is a logical flow diagram illustrating steps taken by a mobile gateway/UE according to an exemplary embodiment of these teachings for deciding which child node sensors to collect data from for the case in which the mobile UE collects sensing data from the C-HPNs as in FIG. 4.
Figure 6:
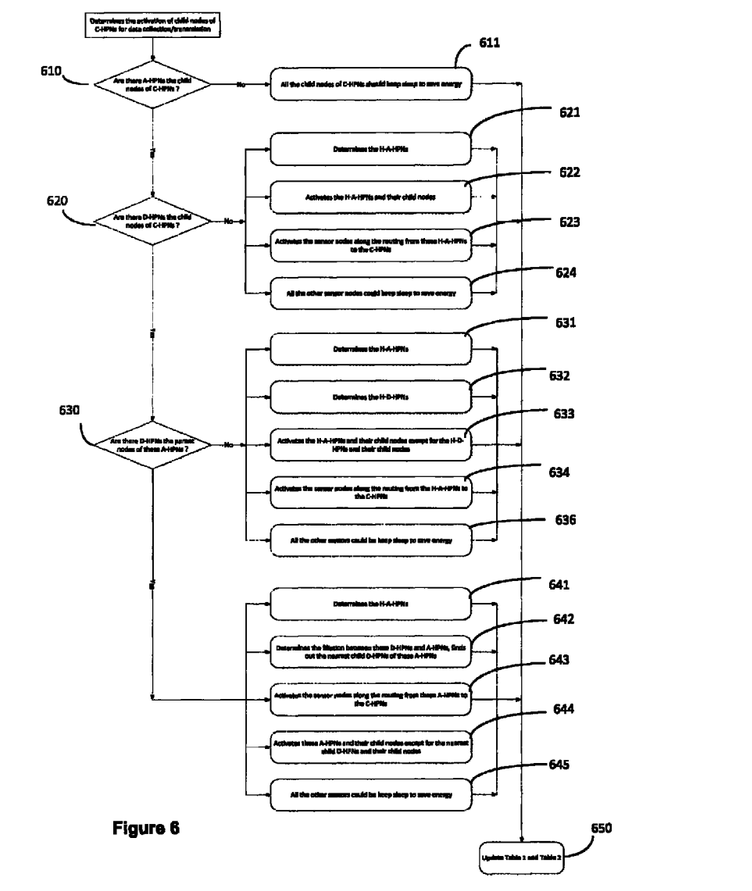
FIG. 6 is a logical flow diagram illustrating steps taken by a mobile gateway/UE according to an exemplary embodiment of these teachings for deciding which child node sensors to collect data from for the case in which the mobile UE does not collect sensing data from the C-HPNs as in FIG. 4.

At step 308 the mobile UE determines the nodes to be activated for data collection/transmission based on the information stored in the depreciated node table 110 and in the appreciated node table 120 (both shown at FIG. 1). FIGS. 4-6 provide further details of example implementations for how the mobile UE determines which nodes are to collect and report data. The mobile U/E determines whether to collect data from the C-HPNs at step 308A, which is detailed further at FIG. 4. The mobile UE determines whether to activate the child nodes of the C-HPNs for data collection and transmission at step 308B, which is detailed further at FIGS. 5-6. Finally, the mobile UE at step 310 activates the determined nodes for data collection and reporting. The U/E updates the tables at step 312; new nodes which have reported new data are now D-HPNs and are added to the depreciated node table 110 (table 1 at block 312) with their corresponding data validity timer, and any node listed on the depreciated node table 110 whose timer has expired are now A-APNs and is moved to the appreciated node table 120.

Based on the movement of mobile UE, the UE's C-HPNs may relate with the H-HPNs in term of topology routing. This relationship is described by example with respect to FIG. 2.

1. The C-HPNs are the parent of H-HPNs, for example, the UE1 moves to a place where the C-HPN is node #0.
2. The C-HPNs are the child of H-HPNs, for example, the UE1 moves to a place where the C-HPN is node #154.
3. The C-HPNs are the parent of some H-HPNs and at the same time the child of some other H-HPNs, for example, the UE1 moves to a place where the C-HPN is node #130 which is the parent of H-HPN #154 and the child of H-HPN #0.
4. The C-HPNs has no relationship of filiation with the H-HPNs, for example, the UE1 moves to a place where the C-HPN is node #1 which is no relationship with the H-HPNs.

FIG. 3 illustrates process steps for how the mobile UE determines which sensor nodes to activate for data collection and reporting, according to an exemplary embodiment of these teachings.

After the mobile UE recognizes which are the C-HPNs at block 402, it determines whether to collect data from the C-HPNs based on the information stored in the depreciated and appreciated node tables (FIG. 1). If the query at block 404 finds that the C-HPNs are D-HPNs, it means that the data collected from C-HPNs before is still valid, and so block 406 tells the mobile UE not to collect data from the C-HPNs. If the query at block 408 finds that the C-HPNs are A-HPNs, it means that the data most recently collected from C-HPNs has expired due to expiration of the data validity timer and so block 410 tells the mobile UE to collect data from the C-HPNs.

If the answer to both queries 404 and 408 is no, then the C-HPNs are neither D-HPNs nor A-HPNs and the process of FIG. 4 moves to block 412 which tests whether any D-HPN is a parent of the C-HPNs. If no D-HPN is the parent of the C-HPNs, it means that no data has been collected from the C-HPNs earlier, or that the data collected earlier from the C-HPNs is expired and no longer valid. Hence, the mobile UE collects data from the C-HPNs at block 414.

If the C-HPNs are neither D-HPNs nor A-HPNs, and the result of the test at block 412 is that some D-HPNs are the parents of the C-HPNs, then there is a further test at block 416. If no A-HPN is the parent of the C-HPNs, it means that the data that was earlier collected from the C-HPNs is still valid. Hence, the mobile UE follows block 416 to block 418 which instructs it not to collect data from the C-HPNs.

If instead at block 416 some A-HPNs are the parents of the C-HPNs, and if at block 420 the A-HPNs are topologically nearer to the C-HPNs as compared to the D-HPNs, it means that the data that was earlier collected from the C-HPNs is out of date and no longer valid and so block 422 tells the UE to collect data from the C-HPNs. Otherwise block 420 means that the data collected earlier from the C-HPNs is valid, and so block 424 tells that the mobile UE should not collect data from the C-HPNs. And finally at block 426 the mobile UE updates the related tables which are shown by example at FIG. 1.

After determining the data collection from the C-HPNs, in an exemplary embodiment the mobile UE then determines the necessary child nodes which should be activated for data collection/transmission so that the unnecessary nodes may continue in their sleep mode and continue to conserve their energy. FIG. 5 illustrates the process flow for selecting the child nodes to activate for the case in which the mobile UE does collect sensing data from the C-HPNs, and FIG. 6 illustrates the process flow for selecting the child nodes to activate for the case in which the mobile UE does not collect sensing data from the C-HPNs.

FIG. 5 is detailed first, and is that portion of the algorithm which the mobile UE executes if it did in fact collect sensing data from the C-HPNs in order to determine which child nodes of the C-HPNs to activate for data collection and reporting. Block 510 tests whether there are any D-HPNs that are child nodes of C-HPNs. If no D-HPN is the child of the C-HPNs, it means that no data has been collected from the C-HPNs' child nodes earlier, or that if there was data collected from them earlier that collected data has expired due to the validity timer. In this case the mobile UE should activate the child nodes for data collection per block 511.

If the query at block 510 finds that one or more D-HPNs are the child of C-HPNs then block 520 tests whether any A-HPN is the child of C-HPNs. If no A-HPN is the child of a C-HPN, this means that the data collected from these D-HPNs and from their child nodes are still valid. In this case the mobile UE then:

determines the highest parent nodes among these D-HPNs (termed H-D-HPNs) at block 521; and
activates all of the child nodes of C-HPNs except for the H-D-HPNs and their child nodes at block 522.

Block 523 simply states that the H-D-HPNs and their child nodes, which were not activated by blocks 521 or 522, should remain in a sleep mode to conserve energy.

If the query at block 520 finds that at least one A-HPN is the child of a C-HPN, then block 530 also tests whether these A-HPNs are also the parent nodes of any H-DPNs. If no to the query at block 520, that is, if some D-HPNs and some A-HPNs are the child nodes of C-HPNs and also none of these A-HPNs is the parent nodes of these D-HPNs, this means that these A-HPNs are the child nodes of all these D-HPNs. In that case the process continues at blocks 531 through 535. Specifically, the mobile UE:

determines the H-D-HPNs among these D-HPNs at block 531;
activates all of the child nodes of C-HPNs except for the H-D-HPNs and their child nodes at block 532;
activates these A-HPNs and their child nodes at block 533; and
activates the sensor nodes along the routing from these A-HPNs to the C-HPNs at block 534.

Block 535 simply states that all the other sensor nodes should stay in a sleep mode for energy savings.

If the result of the query at block 530 is yes, that is, if some D-HPNs (block 510) and some A-HPNs are the child nodes of C-HPNs and these A-HPNs are also the child nodes of some of these D-HPNs (block 520) and the parent nodes of some others of these D-HPNs (block 530), then the process flow of FIG. 5 continues with blocks 541-546. Specifically, the mobile UE:

determines the H-D-HPNs among these D-HPNs at block 541;
determines the filiation (connectedness relationship) between these D-HPNs and A-HPNs at block 542;

finds out the nearest child D-HPNs of these A-HPNs activates all of the child nodes of C-HPNs except for the H-D-HPNs and their child nodes at block 543;

activates these A-HPNs and their child nodes except for the nearest child D-HPNs and their child nodes at block 544; and activates the sensor nodes along the routing from these A-HPNs to the C-HPNs.

Block 546 simply states that all the other sensor nodes should keep sleep for energy saving.

After determining all of the necessary nodes to activate for the collection and reporting of sensing data, the mobile UE activates those determined nodes for data collection. After that data collection, FIG. 5 has one final process block 550 at which the mobile UE updates the information stored in the depreciated and appreciated node tables, which are shown by example at FIG. 1.

FIG. 6 details that portion of the algorithm which the mobile UE executes if it did not collect sensing data from the C-HPNs, in order for the mobile UE to determine which child nodes of the C-HPNs to activate for data collection and reporting. Block 610 tests whether there are any A-HPNs that are child nodes of C-HPNs. If no A-HPN is the child of C-HPNs, this means that the data that has already been collected from the child nodes at an earlier time is still valid, and block 611 tells the mobile UE that it should not activate the child nodes for data collection.

Block 620 tests whether any D-HPNs is a child node of the C-HPNs. If the answer to the block 620 query is yes, that is, if some A-HPNs are the child of C-HPNs (block 610) but no D-HPN is the child of C-HPNs (block 620), this means that the data collected from these A-HPNs and their child nodes is no longer valid. In this case the mobile UE will:

determine the highest parent nodes among these A-HPNs (H-A-HPNs) per block 621;

activate the H-A-HPNs and their child nodes per block 622; and activate the sensor nodes along the routing from these H-A-HPNs to the C-HPNs per block 623.

If the result of the query at block 620 is yes, then block 630 tests whether any of the D-HPNs is a parent node of any of these A-HPNs. If no, then some A-HPNs (block 610) and some D-HPNs (block 620) are the child nodes of C-HPNs, and none of these D-HPNs is the parent nodes of these A-HPNs (block 630). This means that these D-HPNs are the child nodes of all these A-HPNs, in which case the process of FIG. 6 follows blocks 631-636. In this case the mobile UE will:

determine the H-A-HPNs among these A-HPNs per block 631;

determine the H-D-HPNs among these D-HPNs per block 632;

activate the H-A-HPNs and their child nodes except for the H-D-HPNs and their child nodes per block 633; and activate the sensor nodes along the routing from the H-A-HPNs to the C-HPNs per block 634.

Block 635 states that all the other sensor nodes should remain in a sleeping state for energy savings.

If the test at block 630 finds that there is at least one D-HPN that is a parent node to one of those A-HPNs, this means that some A-HPNs (block 610) and some D-HPNs (block 620) are the child nodes of C-HPNs, and these A-HPNs are the child nodes of some of these D-HPNs (block 630) and the parent nodes of some others of these D-HPNs. In this case the flow of FIG. 6 leads to blocks 641-645, in which the mobile UE will then:

determine the H-A-HPNs among these A-HPNs per block 641;

determine the filiation between these D-HPNs and A-HPNs, finds out the nearest child D-HPNs of these A-HPNs per block 642;

activate the sensor nodes along the routing from these A-HPNs to the C-HPNs per block 643; and activate these A-HPNs and their child nodes except for the nearest child D-HPNs and their child nodes per block 644.

Block 645 reminds that all the other sensor nodes should not be activated so they can remain in their sleep state for energy saving.

After determining all of the necessary nodes to activate for the collection and reporting of sensing data, the mobile UE activates those determined nodes for data collection. After that data collection, FIG. 6 closes at block 650 with the mobile UE updating the information stored in the depreciated and appreciated node tables such as for example those shown at FIG. 1.

Certain of the above non-limiting embodiment provide the technical effect of avoiding re-routing signalling which can become considerable in many cases, since there is no need to re-route signalling among the various nodes of the wireless sensor network. This is because the above teachings makes use of the existing topology and routing within the existing wireless sensor network, making it less complex to implement than the two approaches noted in the background section above. Another advantageous technical effect is that only the necessary sensor nodes are activated for data collection and transmission, which is manifest in the reduced energy consumption of the sensor nodes as compared to other techniques which activate sensors that might be providing repetitive data, According to the examples above, longer data validity times yield commensurately greater energy savings.

Figure 7:
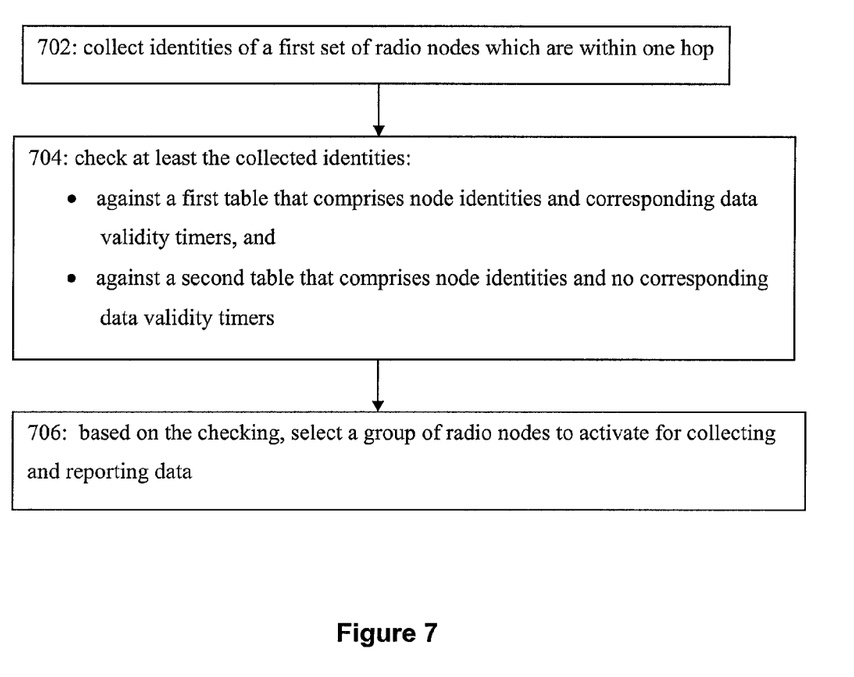
FIG. 7 is a logic flow diagram that illustrates from the perspective of the mobile gateway/UE the operation of a method, and a result of execution of computer program instructions embodied on a computer readable memory, in accordance with certain exemplary embodiments of these teachings.

FIG. 7 is a logic flow diagram which summarizes some example embodiments of the invention. FIG. 7 summarizes some of the above teachings from the perspective of the mobile UE, which may be more generally referred to as a mobile gateway. An apparatus implementing the summary shown at FIG. 7 may be the entire mobile device 20 shown at FIG. 8, or may be one or more components thereof such as a modem, chipset, or the like. FIG. 7 may be considered to illustrate the operation of a method for operating a device, and a result of execution of a computer program tangibly stored in a computer readable memory, and a specific manner in which components of an electronic device are configured to cause that electronic device/system to operate.

The blocks of FIG. 7 and the functions they represent are non-limiting examples, and may be practiced in various components such as integrated circuit chips and modules. Exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a network access node/AP, to perform the various functions summarized at FIG. 5) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" also covers, for example, a baseband integrated circuit or applications processor integrated circuit for a mobile phone or terminal/user equipment or a similar mobile gateway device.

Specifically, the mobile UE/data sink device at block 702 of FIG. 7 collects identities of a first set of radio nodes which are within one hop of the mobile gateway. This is detailed at blocks 302 and 304 of FIG. 3. Then at block 704 the mobile UE checks at least the collected identities against a first table that comprises node identities and corresponding data validity timers, and against a second table that comprises node identities and no corresponding data validity timers. This is a brief summary of block 308 from FIG. 3 but with explanation of the difference between the two tables, and in the above examples. FIGS. 4 through 6 give particular but non-limiting detail how this might be implemented. Then at block 706, based on the checking done at block 704 the mobile UE selects a group of radio nodes to activate for collecting and reporting data.

Figure 8:
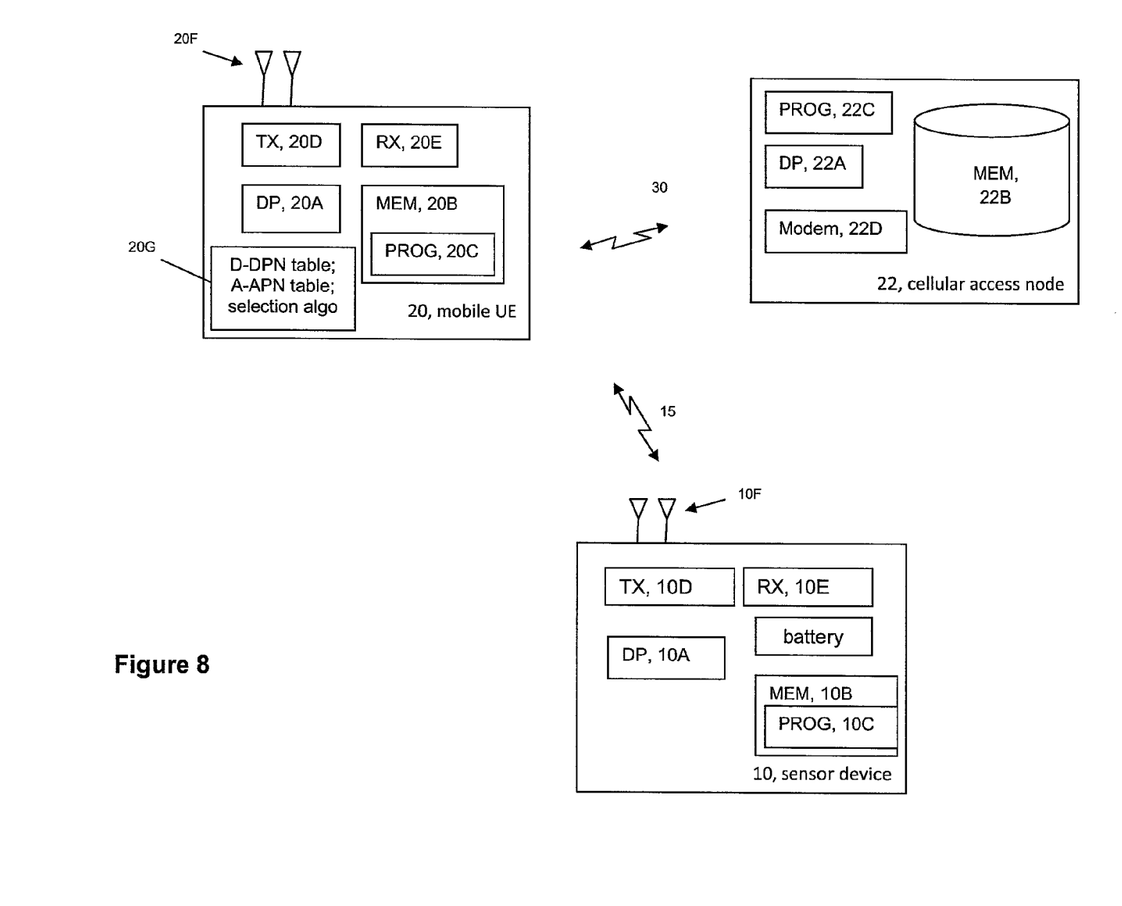
FIG. 8 is a non-limiting example of exemplary electronic devices suitable for use in practicing some example embodiments of these teachings.

Reference is now made to FIG. 8 for illustrating a simplified block diagram of various electronic devices and apparatus that are suitable for use in practicing some example embodiments of this invention. In FIG. 6 there is a mobile gateway device termed a mobile UE 20, that is adapted for communication over a wireless link 15 with the nodes of the wireless sensor network which are illustrated by example as the single sensor device 10 which may or may not be portable (in the FIG. 2 diagram the signalling is wireless but one or more of the sensors and corresponding radios of a given sensor device 10 may be operating on AC power in some deployments). Preferably the mobile UE 20 also provides connectivity via link 30 with another wireless network such as via the illustrated cellular access node 22 of a cellular network or by an access point AP of a wireless local area network WLAN. Through these other wireless networks beyond the sensor network, the mobile UE 20 may then communicate the accumulated sensor data, that it gathered by activating various ones of the sensor devices 10 for collecting and reporting sensor data as detailed above, to a server on the Internet for example, or elsewhere outside the wireless sensor network.

The sensor device 10 includes processing means such as at least one data processor (DP) 10A, storing means such as at least one computer-readable memory (MEM) 10B storing at least one computer program (PROG) 10C, communicating means such as a transmitter TX 10D and a receiver RX 10E for bidirectional wireless communications with the network access node/AP 20 via one or more antennas 10F.

The mobile UE 20 also includes processing means such as at least one data processor (DP) 20A, storing means such as at least one computer-readable memory (MEM) 20B storing at least one computer program (PROG) 20C, and communicating means such as a transmitter TX 20D and a receiver RX 20E for bidirectional wireless communications with the station 10 via one or more antennas 20F. The mobile UE 20 may also have software at 20G for compiling and maintaining the depreciated node table and the appreciated node table shown by example at FIG. 1, and also the algorithm for selecting which sensor devices to activate and which not to activate as detailed more fully by the examples of FIGS. 3 through 6 above.

For completeness there is also shown the cellular access node 22 which has its own processing means such as at least one data processor (DP), storing means such as at least one computer-readable memory (MEM) 22B storing at least one computer program (PROG) 22C, and communicating means such as a modem 22D for bidirectional communications with the mobile UE 20 via the data/control path 30.

While not particularly illustrated for the sensor node 10 or for the mobile UE 20, those devices are also assumed to include as part of their wireless communicating means a modem which may be inbuilt on an RF front end chip within those devices 10, 20 and which also carries the TX 10D/20D and the RX 10E/20E.

At least one of the PROGs 20C/20G in the mobile UE 20 is assumed to include program instructions that, when executed by the associated DP 20A, enable the device to operate in accordance with the exemplary embodiments of this invention for proper tracking of sensor nodes 10, their reported sensing data and corresponding data validity timers, and the parent/child relations among the sensor devices, in order to implement certain aspects of these teachings as detailed above particularly with respect to FIGS. 3-6. In this regard the exemplary embodiments of this invention may be implemented at least in part by computer software stored on the MEM 20B which is executable by the DP 20A of the mobile UE/mobile gateway 20; or by hardware, or by a combination of tangibly stored software and hardware (and tangibly stored firmware). Electronic devices implementing these aspects of the invention may not be the entire mobile UE/mobile gateway 20, but exemplary embodiments may be implemented by one or more components of same such as the above described tangibly stored software, hardware, firmware and DP, modem, system on a chip SOC or an application specific integrated circuit ASIC.

In general, the various embodiments of the station 10 can include, but are not limited to personal portable digital devices having wireless communication capabilities, including but not limited to user equipments, cellular telephones, navigation devices, laptop/palmtop/tablet computers, digital cameras and Internet appliances, as well as machine-to-machine devices such as those implied by FIG. 1A which operate without direct user action.

Various embodiments of the computer readable MEMs 10B, 20B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Depending on the implementation the database system memory 22B may be a disc array. Various embodiments of the DPs 10A, 20A, 22A include but are not limited to general purpose computers, special purpose computers, microprocessors, digital signal processors (DSPs), and multi-core processors.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method for controlling a mobile gateway device comprising:
   collecting, with circuitry, identities of a first set of radio nodes which are within one hop of the mobile gateway;
   checking, with the circuitry, at least the collected identities against a first table that comprises node identities and corresponding data validity timers and a second table that comprises node identities and no corresponding data validity timers, the corresponding data validity timers being set according to data measured by the first set of radio nodes; and
   based on the checking, selecting, with the circuitry, a group of radio nodes to activate for collecting and reporting data, radio nodes having unexpired validity timers being excluded from the group of radio nodes to activate.

2. The method according to claim 1, wherein:
   the selected group includes at least some of the first set of radio nodes and additional radio nodes which are not within one hop of the mobile gateway; and
   all node identities in the first table and in the second table identify nodes from whom identities were collected at a previous time when within one hop of the mobile gateway.

3. The method according to claim 1, further comprising adding to the first table:
   all node identities for radio nodes from which data was received in response to being activated for collecting and reporting data; and
   corresponding data validity timers.

4. The method according to claim 1, wherein checking at least the collected identities comprises:
   determining whether to collect data from current highest parent nodes (C-HPNs) which comprise only some or all of the first set of radio nodes; and
   determining whether to collect data from child nodes of the C-HPNs.

5. The method according to claim 4, wherein it is determined to collect data from the C-HPNs, and the selecting comprises:
   selecting, for inclusion in the group of radio nodes to activate for collecting and reporting data, each radio node of the first set whose identity is listed in the second table; and
   selecting, for exclusion from the group of radio nodes to activate for collecting and reporting data, each radio node of the first set whose identity is listed in the first table.

6. The method according to claim 4, wherein it is determined to collect data from child nodes of the C-HPNs, and the selecting comprises selecting child nodes, for inclusion in the group of radio nodes to activate for collecting and reporting data, based on a parent-child relation of each child node to any of the C-HPNs.

7. An apparatus for selectively collecting data from radio nodes, comprising:
   a processing system comprising at least one memory including computer program code and at least one processor that is configured to
   collect identities of a first set of radio nodes which are within one hop of the mobile gateway;
   check at least the collected identities against a first table that comprises node identities and corresponding data validity timers and a second table that comprises node identities and no corresponding data validity timers, the corresponding data validity timers being set according to data measured by the first set of radio nodes; and
   based on the check, select a group of radio nodes to activate for collecting and reporting data, radio nodes having unexpired validity timers being excluded from the group of radio nodes to activate.

8. The apparatus according to claim 7, wherein
   the selected group includes at least some of the first set of radio nodes and additional radio nodes which are not within one hop of the mobile gateway; and
   all node identities in the first table and in the second table identify nodes from whom identities were collected at a previous time when within one hop of the mobile gateway.

9. The apparatus according to claim 7, in which the at least one processor is further configured to add to the first table:
   all node identities for radio nodes from which data was received in response to being activated for collecting and reporting data; and
   corresponding data validity timers.

10. The apparatus according to claim 7, wherein in checking at least the collected identities, the at least one processor is further configured to:
    determine whether to collect data from current highest parent nodes (C-HPNs) which comprise only some or all of the first set of radio nodes; and
    determine whether to collect data from child nodes of the C-HPNs.

11. The apparatus according to claim 10, wherein it is determined to collect data from the C-HPNs, and in the selecting, the at least one processor is further configured to:
    select, for inclusion in the group of radio nodes to activate for collecting and reporting data, each radio node of the first set whose identity is listed in the second table; and
    select, for exclusion from the group of radio nodes to activate for collecting and reporting data, each radio node of the first set whose identity is listed in the first table.

12. The apparatus according to claim 10, wherein it is determined to collect data from child nodes of the C-HPNs, and in the selecting, the at least one processor is further configured to select child nodes, for inclusion in the group of radio nodes to activate for collecting and reporting data, based on a parent-child relation of each child node to any of the C-HPNs.

13. The apparatus according to claim 12, wherein the parent-child relation is between each child node, through a radio node having a node identity in the first and second list, to any of the C-HPNs.

14. A non-transitory computer-readable medium encoded with computer-readable instructions that, when executed by at least one processor, cause the at least one processor to perform a method comprising:
    collecting identities of a first set of radio nodes which are within one hop of the mobile gateway;
    checking at least the collected identities against a first table that comprises node identities and corresponding data validity timers and a second table that comprises node identities and no corresponding data validity timers, the corresponding data validity timers being set according to data measured by the first set of radio nodes; and
    based on the checking, selecting a group of radio nodes to activate for collecting and reporting data, radio nodes having unexpired validity timers being excluded from the group of radio nodes to activate.

15. The non-transitory computer-readable medium according to claim 14, wherein
- the selected group includes at least some of the first set of radio nodes and additional radio nodes which are not within one hop of the mobile gateway; and
- all node identities in the first table and in the second table identify nodes from whom identities were collected at a previous time when within one hop of the mobile gateway.

16. The non-transitory computer-readable medium according to claim 14, further comprising adding to the first table:
- all node identities for radio nodes from which data was received in response to being activated for collecting and reporting data; and
- corresponding data validity timers.

17. The non-transitory computer-readable medium according to claim 14, wherein checking at least the collected identities comprises:
- determining whether to collect data from current highest parent nodes (C-HPNs) which comprise only some or all of the first set of radio nodes; and
- determining whether to collect data from child nodes of the C-HPNs.

18. The non-transitory computer-readable medium according to claim 17, wherein it is determined to collect data from the C-HPNs, and the selecting comprises:
- selecting, for inclusion in the group of radio nodes to activate for collecting and reporting data, each radio node of the first set whose identity is listed in the second table; and
- selecting, for exclusion from the group of radio nodes to activate for collecting and reporting data, each radio node of the first set whose identity is listed in the first table.

19. The non-transitory computer-readable medium according to claim 17, wherein it is determined to collect data from child nodes of the C-HPNs, and the selecting comprises selecting child nodes, for inclusion in the group of radio nodes to activate for collecting and reporting data, based on a parent-child relation of each child node to any of the C-HPNs.

20. The non-transitory computer-readable medium according to claim 19, in which the parent-child relation is between each child node, through a radio node having a node identity in the first and second list, to any of the C-HPNs.

* * * * *